(12) United States Patent
Wang et al.

(10) Patent No.: US 12,706,617 B2
(45) Date of Patent: Aug. 11, 2026

(54) SELECTIVE FILTERING TO REDUCE INTERFERENCES IN Wi-Fi COMMUNICATIONS

(71) Applicant: HEWLETT PACKARD ENTERPRISE DEVELOPMENT LP, Spring, TX (US)

(72) Inventors: Bo Wang, Beijing (CN); Hongli Zhang, Beijing (CN); Farhan Hasnain, Santa Clara, CA (US); Kehui Cai, Beijing (CN); Kuanyue Li, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 367 days.

(21) Appl. No.: 18/307,890

(22) Filed: Apr. 27, 2023

(65) Prior Publication Data

US 2024/0364367 A1 Oct. 31, 2024

(51) Int. Cl.
*H04B 1/00* (2006.01)
*H04L 25/03* (2006.01)

(52) U.S. Cl.
CPC ..... *H04B 1/0057* (2013.01); *H04L 25/03159* (2013.01)

(58) Field of Classification Search
CPC ................ H04B 1/0057; H04B 1/1036; H04B 2001/1063; H04L 25/03159; H04L 25/03006
See application file for complete search history.

(56) References Cited

U.S. PATENT DOCUMENTS 7,643,848 B2 1/2010 Robinett
8,724,753 B2 5/2014 Demessie et al.
8,906,865 B2 12/2014 Greaves et al.
9,364,588 B2 6/2016 Ding et al.
10,075,198 B1 * 9/2018 Lee ...................... H04W 84/12
11,153,181 B1 10/2021 Tsai et al.
11,356,127 B2 6/2022 Hasnain
11,476,824 B2 10/2022 Cai et al.
(Continued)

FOREIGN PATENT DOCUMENTS

EP 1628408 A1 2/2006
EP 3678307 A1 7/2020
(Continued)

*Primary Examiner* — Jinsong Hu
*Assistant Examiner* — Rui M Hu
(74) *Attorney, Agent, or Firm* — Hewlett Packard Enterprise Patent Department

(57) ABSTRACT

An example method for selectively filtering Wi-Fi signals is presented. A first radio and a second radio of a wireless networking device (WND) are respectively operated on a first channel and a second channel. The first channel and the second channel are respectively within a first sub-band of a first frequency band and second sub-band of a second frequency band. A control unit of the WND may select one of a first filter or a second filter based on the first channel, and one of a third filter or a fourth filter based on the second channel. After the filters are selected, signals over the first channel are communicated through a selected one of the first filter or the second filter, and signals over the second channel are communicated through a selected one of the third filter or the fourth filter.

14 Claims, 5 Drawing Sheets

(56) References Cited

U.S. PATENT DOCUMENTS

2009/0130993 A1 5/2009 Rofougaran et al.
2015/0103663 A1 4/2015 Amini et al.
2015/0119115 A1 4/2015 Bagger et al.
2015/0303952 A1 10/2015 Zeng et al.
2017/0216155 A1 8/2017 Maloney
2018/0019831 A1 1/2018 Zhang
2018/0152988 A1 5/2018 Amini et al.
2019/0306805 A1* 10/2019 Hasnain ................ H04W 88/10
2019/0312336 A1* 10/2019 Son ........................ H01Q 21/30
2020/0129638 A1 4/2020 Van Berkel et al.
2020/0289650 A1 9/2020 Deisher et al.
2021/0067186 A1* 3/2021 Beaudin ................. H04B 1/401
2021/0184707 A1* 6/2021 Hasnain ............... H04B 1/0053
2021/0351903 A1* 11/2021 Mori .................... H04B 1/0057
2022/0014165 A1* 1/2022 Cai ........................ H03H 9/703
2022/0399875 A1* 12/2022 Burra ...................... H03F 3/245
2022/0399909 A1* 12/2022 Krishnamachari .. H04B 1/0078
2022/0416836 A1* 12/2022 Rao ................... H04W 72/0453
2023/0077767 A1* 3/2023 Beaudin ................. H04B 1/006 455/552.1
2023/0094810 A1* 3/2023 Robertson ......... H04W 72/0453 370/329
2023/0144780 A1* 5/2023 Pehlke ................... H04B 1/406 455/188.1
2023/0146310 A1* 5/2023 Pehlke ................. H04B 1/0057 370/338
2023/0189064 A1* 6/2023 Monajemi ........... H04W 72/542 370/329
2023/0223965 A1* 7/2023 Poulin .................... H04B 1/006 455/269
2023/0344461 A1 10/2023 Sheng et al.
2024/0048162 A1* 2/2024 Gatta ................... H04B 1/0064
2024/0120951 A1* 4/2024 Anderson ............ H04B 1/0057
2024/0250701 A1 7/2024 Wang et al.
2024/0421834 A1 12/2024 Patel et al.

FOREIGN PATENT DOCUMENTS

GB 2416625 A 2/2006
WO 2008/001023 A1 1/2008
WO 2018/031644 A1 2/2018
WO 2018/064551 A1 4/2018
WO 2018/193104 A1 10/2018
WO 2019/221670 A1 11/2019
WO 2020/146811 A1 7/2020
WO 2020/249527 A1 12/2020
WO 2020/249528 A1 12/2020
WO 2021/133408 A1 7/2021
WO 2022/139985 A1 6/2022
WO 2022/200463 A1 9/2022

* cited by examiner

SELECTIVE FILTERING TO REDUCE INTERFERENCES IN Wi-Fi COMMUNICATIONS

BACKGROUND

The Unlicensed National Information Infrastructure (U-NII) radio band is a part of the unlicensed radio frequency (RF) spectrum used by IEEE 802.11 devices and wireless internet service providers (ISPs) for wireless fidelity (Wi-Fi) communications. Currently, U-NII allocates Wi-Fi channels in the 5 GHz band across four sub-bands: U-NII-1 (5.118 to 5.250 GHZ), U-NII-2 (5.250 GHz to 5.725 GHZ), U-NII-3 (5.725 GHz to 5.850 GHz), and U-NII-4 (5.850 GHz to 5.925 GHZ).

Recently, with Wi-Fi 6E there have been efforts to include the 6 GHz band for Wi-Fi communications. For instance, U-NII allocates Wi-Fi channels in the 6 GHZ U-NII radio band across four sub-bands: U-NII-5 (5.945 to 6.425 GHZ), U-NII-6 (6.425 GHz to 6.525 GHZ), U-NII-7 (6.525 GHz to 6.875 GHZ), and U-NII-8 (6.875 GHz to 7.125 GHZ). Such channel allocation in the 6 GHz band would greatly increase the number of available channels for Wi-Fi communications, especially as currently available Wi-Fi bands (e.g., 2.4 GHz, 5 GHZ) become increasingly congested from usage by ISPs and wireless local area networks (WLANs). Moreover, such channel allocation in the 6 GHz band brings the possibility of higher aggregated throughput across all Wi-Fi bands. However, a narrow inter-band gap between the existing 5 GHz band and the 6 GHz band makes the RF design more challenging from a coexistence perspective.

BRIEF DESCRIPTION OF THE DRAWINGS

One or more examples in the present disclosure are described in detail with reference to the following Figures. The Figures are provided for purposes of illustration only and merely depict examples.

Figure 1:
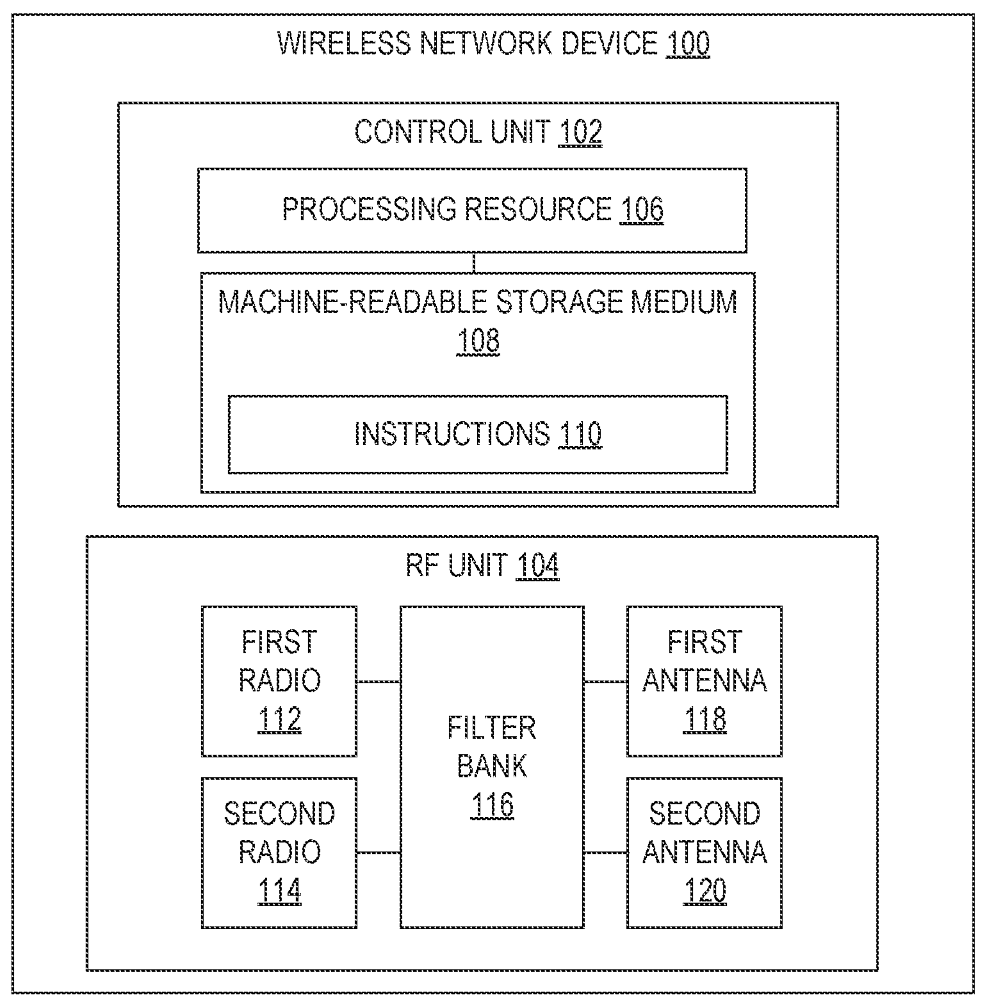
FIG. 1 depicts a block diagram of an example wireless networking device.

The Figures are not exhaustive and do not limit the present disclosure to the precise form disclosed.

DETAILED DESCRIPTION

Despite the great potential that the 6 GHz band offers for increasing channel availability and throughput for Wi-Fi communications, Wi-Fi channel allocation in the 6 GHz band may create co-existence issues with existing 5 GHz Wi-Fi channels. For instance, when a wireless networking device (e.g., an access point or a router) simultaneously operates both a 5 GHz radio using the 5 GHz U-NII channel allocation and a 6 GHz radio using the proposed U-NII 6 GHz channel allocation, jamming and interference may occur for certain Wi-Fi channels within the 5 GHz and 6 GHz bands. Specifically, when the wireless networking device receives a signal in a Wi-Fi channel at or near an upper bound of the 5 GHz band while generating another signal in a Wi-Fi channel at or near a lower bound of the 6 GHz band (or when the wireless networking device receives a signal in a Wi-Fi channel at or near a lower bound of the 6 GHz band while generating another signal in a Wi-Fi channel at or near an upper bound of the 5 GHz band), the received signal may experience jamming and interference from the generated signal, thereby resulting in de-sensitization (e.g., shorter coverage range) and signal quality degradation (e.g., lower throughput) of the received signal.

With the upcoming IEEE WIFI7 802.11.be Standard, key features such as Multi-Link Operation may present some new opportunities to dynamically utilize Access Points radios in a flexible manner to offer such channels amenable to deliver higher throughput and low latency. In some implementations, to deliver such higher throughput and low latency, access point radios have been re-designed with available Wi-Fi bands. For example, in certain known implementations, access points are designed to operate multiple radios in a single band. For example, in a penta-band operation, one radio may be dedicated to the 2.4 GHz band and two radios may be dedicated to each of the 5 GHz and 6 GHz bands. Such a multi-band-multi-radio operation may not only create co-existence issues between the 5 GHz Wi-Fi channels and the 6 GHz Wi-Fi channels but also among the Wi-Fi channels within each of the 5 GHz and 6 GHz bands.

Further, known RF filtering technologies generally use a wide transition bandwidth (e.g., 250 MHz or more) between passband filters for 5 GHz and 6 GHz bands to achieve a certain amount of minimum rejection (e.g., at least 50 dB) useful to mitigate such jamming and interference issues. The band gap between the 5 GHz and 6 GHz bands is merely 50 MHz. As a result, existing RF filtering techniques do not adequately address 5 GHz and 6 GHz Wi-Fi channel co-existence issues for a wireless networking device when a narrow transition bandwidth (e.g., 200 MHZ) is required between Wi-Fi channels at or near the bounds of the 5 GHz and 6 GHz bands. In addition, existing RF filtering techniques may limit the combinations of Wi-Fi channels in the 5 GHz and 6 GHz bands that may be used during continuous 5 GHZ and 6 GHz operation by a wireless networking device.

In examples consistent with the teachings of this disclosure, an enhanced method of filtering and arrangement of RF filters are proposed for a multi-band-multi-radio implementation in a wireless networking device. The proposed enhanced RF filtering techniques and the arrangement of RF filters may aid in mitigating one or more of the challenges described hereinabove. In an example implantation of the wireless networking device, operation over each of the frequency bands such as the 5 GHz and 6 GHz bands may be divided into two sub-bands, wherein the wireless networking device has a dedicated radio to process signal communication over the respective sub-bands. For the sub-bands of the 5 GHz and 6 GHz bands (i.e., sub-bands that are separated by an inter-band gap) that are adjacent to each other, the proposed solution implements a plurality of narrow-band filters having enhanced rejection capabilities compared to typical broad bandwidth filters. The inter-band gap is a band of frequencies separating two Wi-Fi bands, for example, the 5 GHz and 6 GHz bands. Because of the use of the plural narrowband filters for each of the sub-bands separated by the inter-band gap, the proposed wireless networking device is not only able to isolate channels from the 5 GHz and 6 GHz, but also achieves good isolation among the channels operating in the sub-bands within each band.

In particular, in an implementation, for a first sub-band of a first band (e.g., 5 GHz band), the wireless networking device may implement two filters-a first filter and a second filter such that a collective passband of the first filter and the second filter is equivalent to the first sub-band. Signal communications for the first sub-band may be processed via the first radio coupled to the first filter and the second filter. Similarly, for a second band (e.g., 6 GHz band), the wireless networking device may implement two filters—a third filter and a fourth filter such that a collective passband of the third filter and the fourth filter is equivalent to the second sub-band. Signal communications for the second sub-band may be processed via the second radio coupled to the third filter and the fourth filter. During the operation of the wireless networking device, depending on an operating channel within the first sub-band, one of the first and second filters may be selected. Further, depending on an operating channel within the second sub-band, one of the third and fourth filters may be selected. After such selection of the filters, the wireless networking device may simultaneously apply a selected one of the first filter or the second filter to signal communications via the first radio, and a selected one of the third filter or the fourth filter to signal communications via the second radio to avoid communication interference between the first channel and the second channel.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Referring now to the drawings, FIG. 1 depicts a block diagram of an example wireless networking device 100 that implements a selective filtering technique to enable continuous multi-band operation over the Wi-Fi signal spectrum. The wireless networking device 100 may be deployed in the wireless local area networks (WLANs) to provide Wi-Fi connectivity to client devices. For example, the wireless networking device 100 may engage in any network data transmission operations, including, but not limited to, switching, routing, bridging, or a combination thereof. In some examples, the wireless networking device 100 may provide wireless connectivity to the client devices using wireless communication techniques specified in one or more of the Institute of Electrical and Electronics Engineers (IEEE) 802.11 Standard Specifications, for example.

In an example implementation, the wireless networking device 100 may include a wireless access point commonly referred to as an access point (AP). The AP may be an electronic device that is adapted to allow wireless devices to connect to a wired network via various communications standards. An AP may include any hardware components useful to perform the inventions disclosed herein, including, but not limited to processors, memories, display devices, input devices, communications equipment, etc. It will be understood by one of ordinary skill in the art that wireless networking device 100 may be any suitable type(s) of wireless networking device that enables wireless connectivity between two or more wireless capable devices.

The wireless networking device 100 may include a control unit 102 and a radio frequency (RF) unit 104. The RF unit 104 includes electronics to enable data communication via the wireless networking device 100, and the control unit 102 includes processing capabilities to control signal communication via the RF unit 104.

In one example implementation, the control unit 102 may include at least one processing resource, for example, a processing resource 106 and a machine-readable storage medium 108 comprising (e.g., encoded with) instructions 110 that are executable by the processing resource 106 to implement various functionalities of the wireless networking device 100. The machine-readable storage medium 108 may be non-transitory and is alternatively referred to as a non-transitory machine-readable storage medium that does not encompass transitory propagating signals. The machine-readable storage medium 108 may be any electronic, magnetic, optical, or another type of storage device that may store data and/or executable instructions. Examples of the machine-readable storage medium 108 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, optical memory, and the like. The machine-readable storage medium 108 may be encoded with the instructions 110 to manage a selection of filters to be applied to Wi-Fi signals. Although not shown, in some examples, the machine-readable storage medium 108 may be encoded with certain additional executable instructions to perform any other operations performed by the wireless networking device 100, without limiting the scope of the present disclosure.

The processing resource 106 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 108, or combinations thereof. The processing resource 106 may fetch, decode, and execute the instructions 110 stored in the machine-readable storage medium 108 to manage selective filtering of Wi-Fi signals. As an alternative or in addition to executing the instructions 110, the processing resource 106 may include at least one integrated circuit (IC), control logic, electronic circuits, or combinations thereof that include a number of electronic components for performing the functionalities intended to be performed by the wireless networking device 100. In accordance with some examples, the wireless networking device 100 may implement, by way of the processing resource 106 executing the instructions 110, a method of filtering Wi-Fi signals. In some examples, the processing resource 106 may execute one or more of the instructions 110 to perform the method steps described in conjunction with FIGS. 3 and 4.

The RF unit 104 may include a plurality of radios, for example, a first radio 112 and a second radio 114, hereinafter collectively referred to as radios 112, 114. The radios 112, 114 may include electronics (e.g., signal processing circuits such as but not limited to amplifiers, modulators, demodulators, phase-shifters, signal comparators, signal conditioning circuits, etc.) useful to process the signals that are received and/or transmitted by the wireless networking device 100. In some examples, each of the radios 112, 114 may operate at one or more frequency bands that conform to one or more IEEE standards (e.g., 802.11ax). In some examples, the first radio 112 may operate at one or more channels in a first frequency band (e.g., the 5 GHz band). For instance, the first radio 112 may operate at one or more channels across the U-NII-1, U-NII-2, U-NII-3, and U-NII-4 sub-bands. Further, in some examples, the second radio 114 may operate at one or more channels in a second frequency band (e.g., the 6 GHz band). For instance, the second radio 114 may operate at one or more channels across the U-NII-5, U-NII-6, U-NII-7, and U-NII-8 sub-bands. It will be understood by one skilled in the art that the radios 112 and 114 may operate at any suitable frequency band and conform to any suitable type(s) of wireless communication standards, now known and later developed. Moreover, although FIG. 1 shows wireless networking device 100 comprising two radios, it will be understood by one skilled in the art that wireless networking device 100 may comprise any suitable number of radios (for example, five radios as depicted in an example RF unit implementation shown in FIG. 2).

Further, the wireless networking device 100 may include a plurality of antennas, for example, a first antenna 118 and a second antenna 120. In some examples, each of the first antenna 118 and the second antenna 120 may transmit and/or receive directional signals, omnidirectional signals, or a combination thereof. In examples described herein, a "directional" signal refers to a signal which radiates more strongly in one or more directions as compared to one or more other directions along an azimuth plane (i.e., horizontal plane), whereas an "omnidirectional" signal refers to a signal which radiates equally in all directions along an azimuth plane. In some examples, each of the first antenna 118 and the second antenna 120 may comprise a phased array antenna. A "phased array antenna" may refer to an array of antenna elements that can create a directional signal which can be electronically steered to point in different directions without moving the antenna elements. The phased array antenna may comprise an array of directional and/or omnidirectional antenna elements which can focus (i.e., transmit, receive) RF energy in specific spatial directions. It will be understood by one skilled in the art that the first antenna 118 and the second antenna 120 may comprise any suitable type(s) of antenna, now known and later developed. Moreover, although FIG. 1 shows wireless networking device 100 comprising two antennas, it will be understood by one skilled in the art that wireless networking device 100 may comprise four, eight, or any suitable number of antennas.

Furthermore, the wireless networking device 100 includes a filter bank 116 connected to the radios 112, 114 and the antennas 118, 120. In some examples, the filter bank may include a plurality of filters designed with respective passbands to allow the specific signals to pass therethrough thereby providing isolation between the operating channels of the wireless networking device 100. In particular, the signals from the radios 112, 114 to the antennas 118, 120, or vice-versa, may pass through one or more filters of the filter bank 116. The control unit 102 may be configured to, by way of the processing resource 106 executing one or more of the instructions 110, select a filter and apply the selected filter to the signal communication depending on an operating channel in each of the wireless frequency bands. In the examples described herein, a "passband" of a filter refers to a frequency band that the filter allows passing (e.g., transmit or receive) when the filter is applied to a given signal.

The filter bank 116 may include several filters, one or more of which may be dedicated to a predefined sub-band of the present or future Wi-Fi bands. In an example implementation, the filter bank 116 may include two filters for each of the adjacent sub-bands, for example, a first sub-band in the 5 GHz band and a second sub-band in the 6 GHz band. In particular, the first sub-band and the second sub-band are adjacent sub-bands that are separated via an inter-band gap between the 5 GHz band and the 6 GHz band. Also, the first radio 112 may be configured for dedicated use for communication over the first sub-band, and the second radio 112 may be configured for dedicated use for communication over the second sub-band.

For each such adjacent sub-bands of the 5 GHz and 6 GHz bands, the proposed solution implements a plurality of narrow-band filters (e.g., two filters) having enhanced rejection capabilities compared to typical broad bandwidth filters. Because of the use of the plural narrowband filters for each of the sub-bands separated by the inter-band gap, the proposed wireless networking device is not only able to isolate channels from the 5 GHz and 6 GHz, but also achieves isolation among the channels operating in the sub-bands within each band.

During the operation of the wireless networking device 100, depending on an operating channel within the first sub-band, the control unit 102 may be configured to select one of the two filters dedicated to the first sub-band. Further, depending on an operating channel within the second sub-band, the control unit 102 may be configured to select one of the two filters dedicated to the second sub-band. After such selection of the filters, the wireless networking device may simultaneously apply the selected filters to the signal communications via the first radio and the second radio to avoid communication interference between the first channel and the second channel. Additional details about the selection of the filters are described in conjunction with the methods described in FIGS. 3 and 4.

Figure 2:
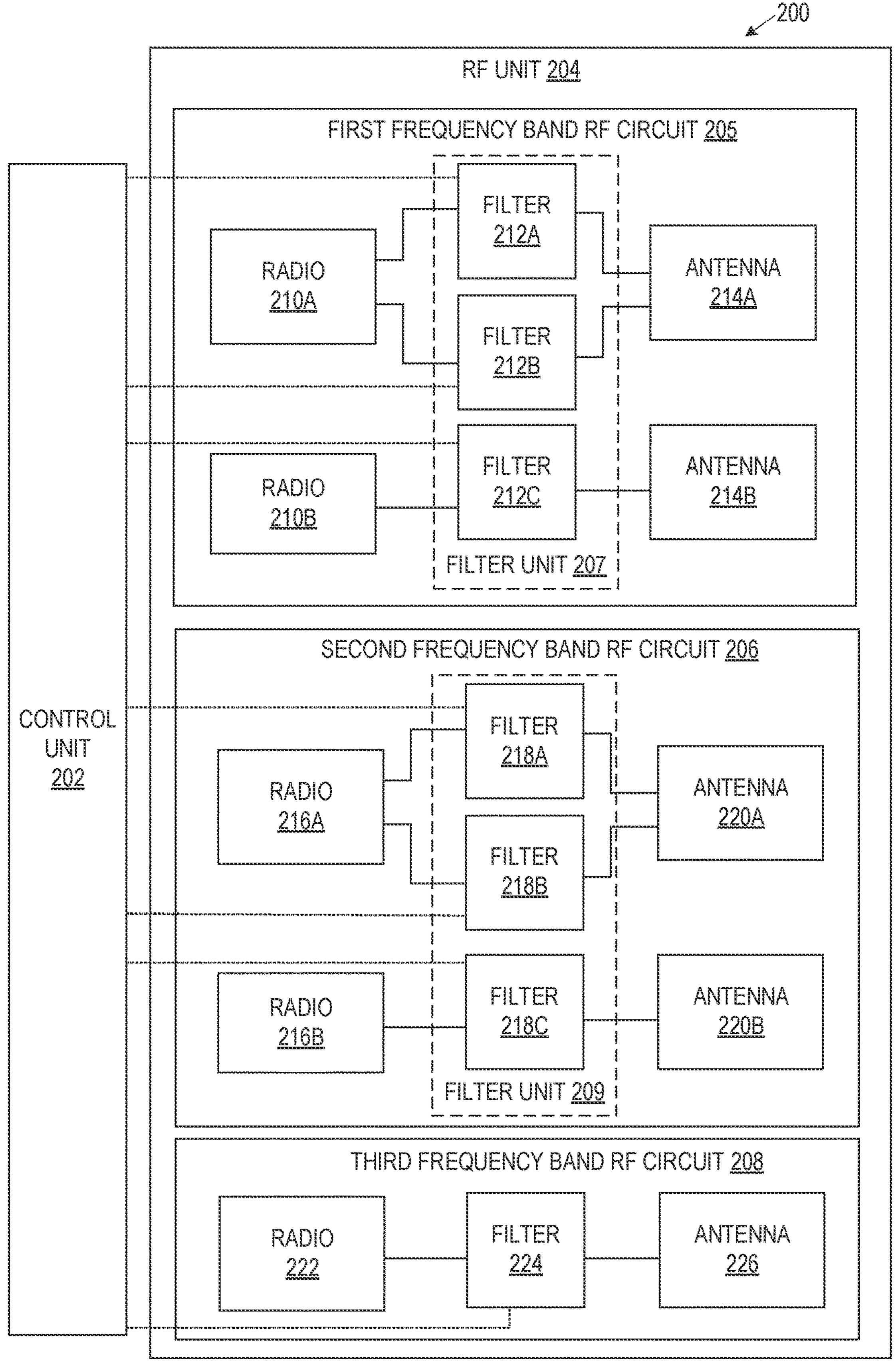
FIG. 2 depicts a block diagram of another example wireless networking device.

Turning now to FIG. 2, FIG. 2 describes another example wireless networking device 200. The wireless networking device 200 may be an example representative of the wireless networking device 100 of FIG. 1. The wireless networking device 200 includes a control unit 202 and an RF unit 204 which are example representatives of the control unit 102 and the RF unit 104 of FIG. 1. For simplicity of representation, internal components of the control unit 202 are not shown in FIG. 2. In some implementations, the control unit 202 may include a processing resource and a machine-readable storage medium similar to those described in conjunction with FIG. 1.

In an example implementation, the RF unit 204 may include a plurality of RF circuits, such as, a first frequency band RF circuit 205, a second frequency band RF circuit 206, and a third frequency band RF circuit 208. The RF circuits 205, 206, and 208 may be dedicated for signal communication over 5 GHZ, 6 GHZ, and 2.4 GHz bands, respectively. Table-1 presented below shows the frequency ranges of the 5 GHZ, 6 GHZ, and 2.4 GHz bands.

TABLE 1

Wi-Fi Bands

| Wi-Fi band | Frequency range |
|---|---|
| 2.4 GHz | 2401 MHz-2495 MHz |
| 5 GHz | 5150 MHz-5895 MHz |
| 6 GHz | 5945 MHz-7125 MHz |

The first frequency band RF circuit 205, hereinafter also referred to as, a 5 GHz RF circuit 205 may include a plurality of radios, for example, radios 210A and 210B. The radios 210A and 210B may be configured to communicate signals over pre-defined sub-bands of the 5 GHz band. For example, the radios 210A and 210B may be configured to communicate signals over a first 5 GHz sub-band (also referred to as "lower 5 GHz sub-band") and a second 5 GHz sub-band (also referred to as "upper 5 GHz sub-band"), respectively. Further, the 5 GHZ RF circuit 205 may also include a filter bank 207 comprising a plurality of filters such as filters 212A, 212B, and 212C; and antennas 214A and 214B. The filters 212A and 212B are coupled to the radio 210A and the antenna 214A, and the filter 212C is coupled to the radio 210B and the antenna 214B. During operation, the control unit 202 may be configured to selectively apply one or more of the filters 212A, 212B, and 212C to the received and/or to be transmitted signals depending on the operating channels within the 5 GHz band. The selection of filters will be described in greater detail in the description below.

Further, the second frequency band RF circuit 206, hereinafter also referred to as, a 6 GHZ RF circuit 206 may include a plurality of radios, for example, radios 216A and 216B. The radios 216A and 216B may be configured to communicate signals over pre-defined sub-bands of the 5 GHz band. For example, the radios 210A and 210B may be configured to communicate signals over a first 6 GHz sub-band (also referred to as "lower 6 GHz sub-band") and a second 6 GHz sub-band (also referred to as "upper 6 GHz sub-band"), respectively. Further, the 6 GHz RF circuit 206 may also include a filter bank 209 comprising a plurality of filters such as filters 218A, 218B, and 218C; and antennas 220A and 220B. The filters 218A and 218B are coupled to the radio 216A and the antenna 220A, and the filter 218C is coupled to the radio 216B and the antenna 220B. During operation, the control unit 202 may be configured to selectively apply one or more of the filters 218A, 218B, and 218C to the received and/or to be transmitted signals depending on the operating channels within the 6 GHz band.

Furthermore, the third frequency band RF circuit 208, hereinafter also referred to as, a 2.4 GHz RF circuit 208 may include a radio, for example, a radio 222, that is configured to communicate signals over the 2.4 GHz band. Further, the 2.4 GHz RF circuit 208 may also include a filter 224 and antennas 226. The filter 224 is coupled to the radio 222 and the antenna 226. During operation, the control unit 202 may be configured to apply the filter 224 to the received and/or to be transmitted signals over any channel in the 2.4 GHZ band. Table-2 presented below shows example ranges of the sub-bands and respective RF components of the RF unit 204. It is to be noted that the example sub-band ranges shown in Table 2 are illustrative ranges and do not limit the scope of the present disclosure.

TABLE 2

Wi-Fi Sub-bands and respective radios, filters, and antennas

| Wi-Fi band | Sub-band | Frequency range | Radio | Usable filters | Antenna |
|---|---|---|---|---|---|
| 5 GHz | First 5 GHz sub-band (Lower 5 GHz sub-band) | 5150 MHz-5330 MHz | 210B | 212C | 214B |
| | Second 5 GHz sub-band (Upper 5 GHz sub-band) | 5490 MHz-5895 MHz | 210A | 212A, 212B | 214A |
| 6 GHz | First 6 GHz sub-band (Lower 5 GHz sub-band) | 5945 MHz-6425 MHz | 216A | 218A, 218B | 220A |
| | Second 6 GHz sub-band (Upper 5 GHz sub-band) | 6525 MHz-7125 MHz | 216B | 218C | 220B |
| 2.4 GHz | NA | 2401 MHz-2495 MHz | 222 | 224 | 226 |

The filters 212A-212C and the filters 218A-218C which are implemented for the sub-bands of the 5 GHZ and 6 GHz bands, are narrow-band filters having enhanced rejection capabilities compared to typical broad bandwidth filters. Because of the use of the plural narrowband filters 212A-212C and 218A-218C, the proposed wireless networking device 200 is not only able to isolate channels from the 5 GHz and 6 GHZ, but also achieves good isolation among the channels operating in the sub-bands within each band. Table 3 presented below shows example passbands of the filters 212A-212C, 218A-218C, and 224. It is to be noted that the example passbands shown in Table 3 are illustrative ranges and do not limit the scope of the present disclosure. Filters with any suitable narrow passbands may be implemented, without limiting the scope of the present disclosure.

TABLE 3

Filter passbands

| Filter | Also referred to as | Passband |
|---|---|---|
| Filter 212A | Lower bound 5 GHz filter | 5735 MHz-5895 MHz |
| Filter 212B | Upper bound 5 GHz filter | 5835 MHz-5940 MHz |
| Filter 212C | Lower 5 GHz sub-band filter | 5150 MHz-5330 MHz |
| Filter 218A | Lower bound 6 GHz filter | 5945 MHz-6265 MHz |
| Filter 218B | Upper bound 6 GHz filter | 6105 MHz-6425 MHz |
| Filter 218C | Upper 6 GHz sub-band filter | 6525 MHz-7125 MHz |
| Filter 224 | 2.4 GHz Channel Filter | 2401 MHz-2495 MHz |

In the examples described herein, a "passband" of a filter refers to a frequency band that the filter allows passing (e.g., transmit and/or receive) when the filter is applied to a given signal. It will be understood by one skilled in the art that the filters 212A-212C may allow any suitable frequency ranges encompassing one or more Wi-Fi channels of the 5 GHz band to pass. Similarly, the filters 218A-218C may allow any suitable frequency ranges encompassing one or more Wi-Fi channels of the 6 GHz band to pass.

In an example configuration of the filters shown in Table-3, the filters 212A and 212B may be designed to have overlapping passbands. Similarly, the filters 218A and 218B may be designed to have overlapping passbands. For example, the filter 212B may be designed with a passband ending at an ending frequency of the upper 5 GHz sub-band, and the filter 212A is designed with a passband beginning at a starting frequency of the upper 5 GHz sub-band. Also, in some examples, the filter 218A may be designed with a passband beginning at a starting frequency of the lower 6 GHz sub-band, and the filter 218A is designed with a passband that ends at an ending frequency of the lower 6 GHz sub-band.

In certain other examples, the filters 212A and 212B, and the filters 218A and 218B may be designed to have non-overlapping passbands. Also, the filters 212A and 212B may be designed such that a collective passband of the filters 212A and 212B is equivalent to the second 5 GHz sub-band (e.g., 5490 MHz-5895 MHZ). Also, the filters 218A and 218B may be designed such that a collective passband of the filters 218A and 218B is equivalent to the first 6 GHz sub-band (e.g., 5945 MHz-6425 MHZ). Further, in some examples, the filters 212B and 218A may be designed to have narrower passbands compared to the filters 212A and 218B, respectively, to provide steeper rejection at the edge of the 5 GHz and 6 GHz bands.

During the operation of the wireless networking device, depending on the operating channels on the control unit 202 may select relevant filters and the signals communicated over the operating channels may be processed through the respective selected filters. For example, signals over the 2.4 GHz band may be processed via the 2.4 GHz Channel Filter (e.g., the filter 224). Further, signals over any of the channels within the lower 5 GHz sub-band (e.g., 5150 MHz-5330 MHZ) may be processed via the lower 5 GHz sub-band filter (e.g., the filter 212C). Further, for any operating channel within the upper 5 GHz sub-band, the control unit 202 may select one of the lower bound 5 GHz filter (e.g., the filter 212A) or the upper bound 5 GHz filter (e.g., the filter 212B) depending on the operating channel. The use of the multiple narrow passband filters for processing signals within the upper 5 GHz sub-band, not only aids in effectively isolating signals from co-existing operating 6 GHz channels but also effectively isolates co-existing operating channels in the lower 5 GHz sub-band.

Similarly, signals over any of the channels within the upper 6 GHz sub-band (e.g., 6525 MHz-7125 MHZ) may be processed via the upper 6 GHz sub-band filter (e.g., the filter 218C). Further, for any operating channel within the lower 6 GHz sub-band, the control unit 202 may select one of the lower bound 6 GHz filter (e.g., the filter 218A) or the upper bound 6 GHz filter (e.g., the filter 218B) depending on the operating channel. The use of the multiple narrow passband filters for processing signals within the lower 6 GHz sub-band, not only aids in effectively isolating signals from co-existing operating 5 GHZ channels but also effectively isolates co-existing operating channels in the upper 6 GHz sub-band.

In accordance with aspects of the present disclosure, the wireless networking device 200 may prevent interference and jamming of Wi-Fi signals over any operating channels over its radios (e.g., radios 210A, 210B, 216A, 216B, and 222). For instance, when a received signal is in the upper 5 GHz sub-band and a generated signal is in the lower 6 GHz sub-band, wireless networking device 200 may prevent interference in the received 5 GHz signal from the generated 6 GHz signal by applying one of the filters 212A or 212B to the 5 GHz signal and one of the filters 218A or 218B to the generated 6 GHz signal. That is, by applying such filters to these signals, wireless networking device 200 may prevent the jamming of the received 5 GHz signal from the generated 6 GHz signal by filtering an undesired coupling of the generated 6 GHz signal to the received 5 GHZ signal.

Also, in some examples, when a received signal is in the lower 5 GHz sub-band and a generated signal is in the upper 5 GHz sub-band, wireless networking device 200 may prevent interference in the received 5 GHz signal from the generated 5 GHz signal by applying the filter 212C to the received signal and one of the filters 212A or 212B to the generated signal. Similarly, when a received signal is in the upper 6 GHz sub-band and a generated signal is in the lower 6 GHz sub-band, the wireless networking device 200 may prevent interference in the received 6 GHz signal from the generated 5 GHz signal by applying the filter 218C to the received signal and one of the filters 218A or 218B to the generated signal.

In this manner, the example wireless networking device 200 may provide continuous 5 GHz and 6 GHz operation by selective filtering. Also, the use of the narrow passband filters allows a narrow transition gap to be maintained between Wi-Fi channels over the radios 210A, 210B, 216A, 216B, and 222, while still achieving certain minimum level rejection (e.g., at least 50 dB) required to mitigate jamming and interference of received signals in such Wi-Fi channels. Thus, the selective filtering of the example wireless networking device 200 may prevent de-sensitization and degradation of signals communicating over the operating channels providing greater channel availability and higher aggregated throughput for continuous 5 GHz and 6 GHz operation. In addition, the selective filtering of the example wireless networking device may allow more combinations of Wi-Fi channels in the 5 GHz and 6 GHz bands to be used during continuous 5 GHz and 6 GHz operation by the wireless networking device.

Figure 3:
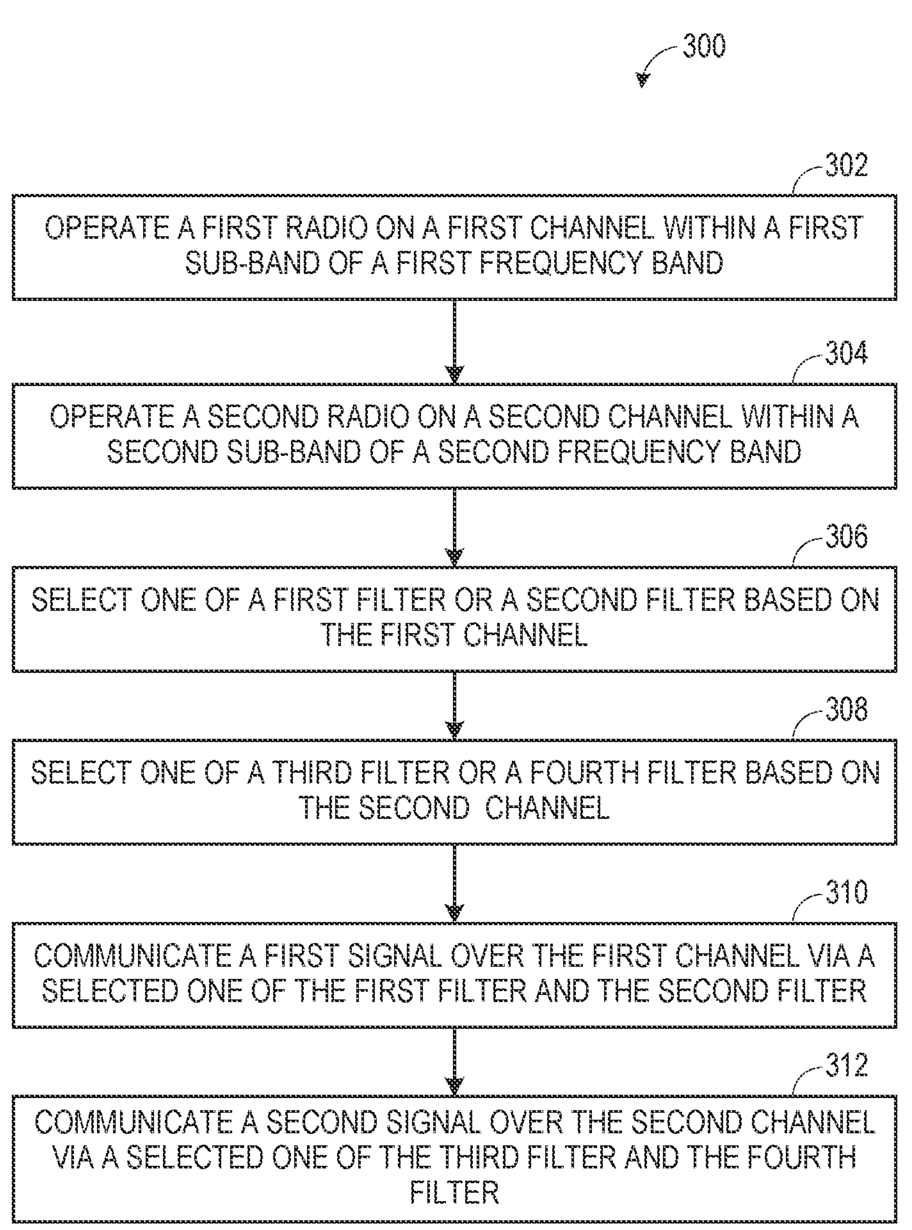
FIG. 3 depicts a flowchart of an example method for selectively filtering Wi-Fi signals on a wireless networking device.

Referring now to FIG. 3, a flowchart of an example method 300 for selectively filtering Wi-Fi signals is depicted. In some examples, the steps shown in FIG. 3 may be performed by any suitable device, such as the wireless networking device, for example, an access point. In some examples, the suitable device may include a processing resource (e.g., the processing resource 106 depicted in FIG. 1) suitable for retrieval and execution of instructions (e.g., the instructions 110 depicted in FIG. 1) stored in a machine-readable storage medium (e.g., the machine-readable storage medium 108 depicted in FIG. 1). As an alternative or in addition to retrieving and executing instructions, the processing resource may include one or more electronic circuits that include electronic components for performing the functionality of one or more instructions, such as an FPGA, ASIC, or other electronic circuits.

At step 302, a control unit of a wireless networking device may operate the first radio (e.g., the radio 210A of FIG. 2) of the wireless networking device on a first channel within a first sub-band of a first frequency band. The first sub-band referenced in step 302 is the upper 5 GHz sub-band (e.g., the second 5 GHz sub-band ranging from 5490 MHz-5895 MHz) of the 5 GHz band and the first channel may be any Wi-Fi channel in the upper sub-band of the 5 GHz band.

Further, at step 304, the control unit may operate a second radio (e.g., the radio 216A of FIG. 2) of the wireless networking device on a second channel within a second sub-band of a second frequency band. The second sub-band referenced in step 304 is a lower sub-band (e.g., the first 6 GHz sub-band ranging from 5945 MHZ-6425 MHZ) of the 6 GHz band and the second channel may be any Wi-Fi channel in such lower sub-band of the 6 GHz band. As will be understood, the first sub-band and the second sub-band referenced in steps 302 and 304 are immediately adjacent to an inter-band gap separating the first frequency band (e.g., the 5 GHz band) and the second frequency band (e.g., the 5 GHz band). Operating the radios at steps 302 and 304 may include powering the radios so that the radios process the signals to be transmitted or received by the wireless networking device.

Furthermore, at block 306, the control unit may select one of a first filter (e.g., the filter 212A having an example passband of 5735 MHz-5895 MHZ) or a second filter (e.g., the filter 212B having an example passband of 5835 MHz-5940 MHZ) based on the first channel. The second filter may have a higher center frequency compared to the first filter. The center frequency for a given filter refers to a mid-point of the passband of the given filter.

If the first filter and the second filters are designed to have overlapping passbands, the control unit may select the first filter, in response to determining that the first filter encompasses the first channel. To determine if a given filter encompasses a given channel, the control unit may check if the complete bandwidth of the given channel is within the given filter's passband. Accordingly, if the control unit determines that the bandwidth of the first channel is within the pass band of the first filter, the control unit determines that the first filter encompasses the first channel. However, if the first filter does not encompass the first channel, the control unit selects the second filter. In another implementation, the first filter and the second filters may be designed to have non-overlapping passbands. In such an implementation, the control unit may select the first filter in response to determining that the first filter encompasses the first channel. However, in response to determining that the second filter encompasses the first channel, the control unit may select the second filter.

Moreover, at step 308, the control unit may select one of a third filter (e.g., the filter 218A having an example passband of 5945 MHz-6265 MHZ) or a fourth filter (e.g., the filter 218B having an example passband of 6105 MHZ-6425 MHZ) based on the second channel. The fourth filter may have a higher center frequency compared to the third filter. If the third and fourth filters are designed to have overlapping passbands, the control unit may select the fourth filter, in response to determining that the fourth filter encompasses the second channel. However, if the fourth filter does not encompass the second channel, the control unit selects the third filter. In another implementation, the third and fourth filters may be designed to have non-overlapping passbands. In such an implementation, the control unit may select the third filter in response to determining that the third filter encompasses the third channel or select the fourth filter in response to determining that the fourth filter encompasses the third channel.

Once the filters are selected, during the operation of the wireless networking device, the control unit, at step 310, may communicate a first signal (e.g., any signal transmitted and/or received over the first channel) over the first channel through a selected one of the first filter or the second filter. Similarly, at step 312, the control unit may communicate a second signal (e.g., any signal transmitted and/or received over the first channel) over the second channel through a selected one of the third filter or the fourth filter to avoid communication interference between the first channel and the second channel.

Figure 4:
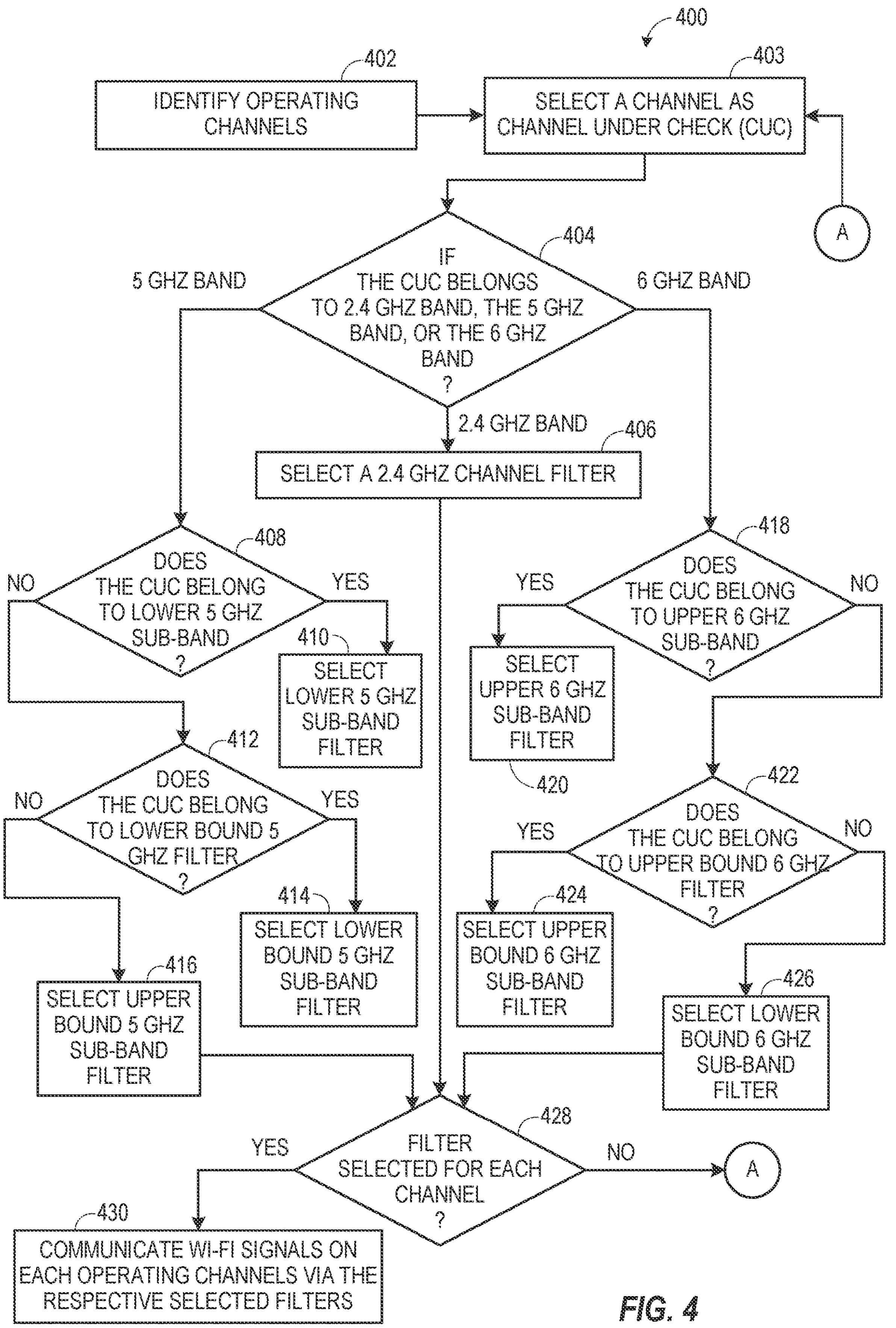
FIG. 4 depicts a flowchart of another example method for selectively filtering Wi-Fi signals on a wireless networking device.

Referring now to FIG. 4, a flowchart of an example method 400 for selectively filtering Wi-Fi signals is depicted. In some examples, the steps shown in FIG. 4 may be performed by any suitable device, such as the wireless networking device, for example, an access point. For illustration purposes, the method 400 is described in conjunction with the wireless networking device 200 of FIG. 2. However, the scope of the present disclosure is not limited with respect to the specifics (e.g., components, their arrangement, and/or frequency ranges) of the wireless networking device 200. In some examples, the suitable device that executes the method 400 may include a processing resource (e.g., the processing resource 106 depicted in FIG. 1) suitable for retrieval and execution of instructions (e.g., the instructions 110 depicted in FIG. 1) stored in a machine-readable storage medium (e.g., the machine-readable storage medium 108 depicted in FIG. 1). As an alternative or in addition to retrieving and executing instructions, the processing resource may include one or more electronic circuits that include electronic components for performing the functionality of one or more instructions, such as an FPGA, ASIC, or other electronic circuits.

For the purpose of illustration, the method 400 is considered to be performed on the wireless networking device (e.g., the wireless networking device 200) operating in a penta-band mode. The wireless networking device in a penta-band mode may be implemented to have a radio configured for the 2.4 GHz band, two radios configured for the 5 GHZ, and two radios configured for the 6 GHz band operation. Also, for the purpose of illustration, the filters 212A and 218A are designed to have overlapping passbands with the filters 212B and 218B, respectively.

At step 402, a control unit (e.g., the control unit 202) may identify operating channels on each of the sub-bands based on the configuration data of the wireless networking device. Then, for each of the identified channels, the control unit may select a suitable filter as described in conjunction with steps 403-426.

At step 403, the control unit selects a channel to assign a suitable filter from a filter bank. The channel selected at step 403 is hereinafter referred to as a channel under check (CUC). At step 404, the control unit may perform a check to determine if the CUC belongs to the 2.4 GHz band, the 5 GHz band, or the 6 GHz band. At step 404, if it is determined that the CUC belongs to the 2.4 GHz band, at step 406, the control unit may select a 2.4 GHz channel filter (e.g., the filter 224) for the CUC. Signals communicating over any operating channel in the lower 2.4 GHz band may be processed via the 2.4 GHz channel filter.

At step 404, if it is determined that the CUC belongs to the 5 GHz band, at step 408, the control unit may perform another check to determine if the CUC belongs to a lower 5 GHz sub-band (e.g., the first 5 GHz sub-band ranging from 5150 MHz-5330 MHZ). At step 408, if the control unit determines that the CUC belongs to the lower 5 GHz sub-band, the control unit, at step 410, selects a lower 5 GHz sub-band filter (e.g., the filter 212C) for the CUC. Signals communicating over any operating channel in the lower 5 GHz sub-band may be processed via the lower 5 GHz sub-band filter.

However, at step 408, if the control unit determines that the CUC does not belong to the lower 5 GHz sub-band (i.e., the CUC belongs to the upper 5 GHz sub-band ranging from 5490 MHz-5895 MHZ), the control unit, at step 412, performs another check to determine if the CUC belongs to a passband of a lower bound 5 GHz filter (e.g., the filter 212A having a passband of 5735 MHz-5895 MHZ). If it is determined that the CUC belongs to a passband of the lower bound 5 GHz filter, the control unit, at step 414, selects the lower bound 5 GHz filter for the CUC. If the CUC does not belong to the passband of the lower bound 5 GHz filter, the control unit, at step 416, may select an upper bound 5 GHz filter (e.g., the filter 212B having the passband of 5835 MHz-5940 MHZ). Signals communicating over any operating channel in the upper 5 GHZ sub-band may be processed via the upper 5 GHz sub-band filter.

Returning to step 404, if it is determined that the CUC belongs to the 6 GHz band, at step 418, the control unit may perform another check to determine if the CUC belongs to an upper 6 GHz sub-band (e.g., the second 6 GHz sub-band ranging from 6525 MHz-7125 MHz). At step 418, if the control unit determines that the CUC belongs to the upper 6 GHz sub-band, the control unit, at step 420, selects the upper 6 GHz sub-band filter (e.g., the filter 218C) for the CUC.

Signals communicating over any operating channel in the lower 6 GHz sub-band may be processed via the lower 6 GHz sub-band filter.

However, at step 418, if the control unit determines that the CUC does not belong to the upper 6 GHz sub-band (i.e., the CUC belongs to the lower 6 GHz sub-band ranging from 5945 MHZ-6425 MHz), the control unit, at step 422, performs another check to determine if the CUC belongs to a passband of an upper bound 6 GHz filter (e.g., the filter 218B having a passband of 6105 MHZ-6425 MHZ). If it is determined that the CUC belongs to the passband of the upper bound 6 GHz filter, the control unit, at step 424, selects the upper bound 6 GHz filter for the CUC. If the CUC does not belong to the passband of the upper bound 6 GHz filter, the control unit, at step 426, may select, a lower bound 6 GHz filter (e.g., the filter 218A having the passband of 5945 MHZ-6265 MHZ). Signals communicating over any operating channel in the upper 6 GHz sub-band may be processed via the upper 6 GHz sub-band filter.

Further, at step 428, the control unit may perform a check to determine if a filter is selected for each of the identified channels at step 402. At step 428, if it is determined that a filter is not selected for all identified channels, the control unit may select one of the remaining channels as the channel under check (CUC) at step 403 and select a corresponding suitable channel by performing suitable steps of the steps 404-426. However, at step 428, if it is determined that a filter is selected for each of the identified channels, the control unit, at step 430, may activate the selected filters for each channel and the wireless networking device may communicate a Wi-Fi signal over each of the operating channels (identified at step 402) via the respective selected filters.

Table 4 presented below depicts an example configuration specifying applied filters for each of the operating channels listed in Table 4.

TABLE 4

Example operating channels and filter selection

| Wi-Fi band | Sub-band | Channel | Channel bandwidth | Selected Filter |
|---|---|---|---|---|
| 2.4 GHz | N/A | 1 | 2401 MHz-2423 MHz | 224 |
| 5 GHz | First 5 GHz sub-band (Lower 5 GHz sub-band) | 40 (U-NII-1) | 5190 MHz-5210 MHz | 212C |
| | Second 5 GHz sub-band (Upper 5 GHz sub-band) | 153 (U-NII-3) | 5755 MHz-5775 MHz | 212A |
| 6 GHz | First 6 GHz sub-band (Lower 6 GHz sub-band) | 13 (U-NII-5) | 6005 MHz-6025 MHz | 218A |
| | Second 6 GHz sub-band (Upper 6 GHz sub-band) | 137 (U-NII-7) | 6625 MHz-6645 MHz | 218C |

For the example operating channel configuration depicted in Table-4, the control unit may identify five operating channels (e.g., channels 1, 40, 153, 13, and 137) of the wireless networking device. Then, for each of the identified channels 1, 40, 153, 13, and 137, the control unit selects filters 224, 212C, 212A, 218A, and 218C based on the channel bandwidths and by executing one or more of the steps 403-426. For instance, as channel 1 belongs to the 2.4 GHz band, the filter 224 is applied for all signal communications over Channel 1. Further, because channels 40 in U-NII-1 and 137 in U-NII-7 respectively belong to the lower 5 GHz sub-band and the upper 6 GHz sub-band, the control unit applies the filters 212C and 218C to the signals communicating over channels 40 and 137, respectively. Further, as channel 153 in U-NII-3 belongs to the passband of the filter 212A, the control unit applies the filter 212A to the signals communicating over channel 153. Moreover, as channel 13 in U-NII-5 belongs to the passband of the filter 218A, the control unit applies the filter 218A to the signals communicating over channel 13.

Table 5 presented below depicts another example configuration specifying applied filters for each of the operating channels listed in Table 5.

TABLE 5

Example operating channels and filter selection

| Wi-Fi band | Sub-band | Channel | Channel bandwidth | Selected Filter |
|---|---|---|---|---|
| 2.4 GHz | N/A | 6 | 2426 MHz-2448 MHz | 224 |
| 5 GHz | First 5 GHz sub-band (Lower 5 GHz sub-band) | 40 (U-NII-1) | 5190 MHz-5210 MHz | 212C |

TABLE 5-continued

Example operating channels and filter selection

| Wi-Fi band | Sub-band | Channel | Channel bandwidth | Selected Filter |
|---|---|---|---|---|
| | Second 5 GHz sub-band (Upper 5 GHz sub-band) | 177 (U-NII-4) | 5875 MHz-5895 MHz | 212B |
| 6 GHz | First 6 GHz sub-band (Lower 6 GHz sub-band) | 77 (U-NII-5) | 6325 MHz-6345 MHz | 218B |
| | Second 6 GHz sub-band (Upper 6 GHz sub-band) | 137 (U-NII-7) | 6625 MHz-6645 MHz | 218C |

For the example operating channel configuration depicted in Table-4, the control unit may identify five operating channels (e.g., channels 6, 40, 177, 77, and 137) of the wireless networking device. Then, for each of the identified channels 6, 40, 177, 77, and 137, the control unit selects filters 224, 212C, 212B, 218B, and 218C based on the channel bandwidths and by executing one or more of the steps 403-426. For instance, as channel 6 belongs to the 2.4 GHz band, the filter 224 is applied for all signal communications over channel 6. Further, because channels 40 in U-NII-1 and 137 in U-NII-7 respectively belong to the lower 5 GHz sub-band and the upper 6 GHz sub-band, the control unit applies the filters 212C and 218C to the signals communicating over channels 40 and 137, respectively. Furthermore, as channel 177 in U-NII-4 belongs to the passband of the filter 212B, the control unit applies the filter 212B to the signals communicating over channel 153. Moreover, as channel 77 in U-NII-5 belongs to the passband of the filter 218B, the control unit applies the filter 218B to the signals communicating over channel 77.

Figure 5:
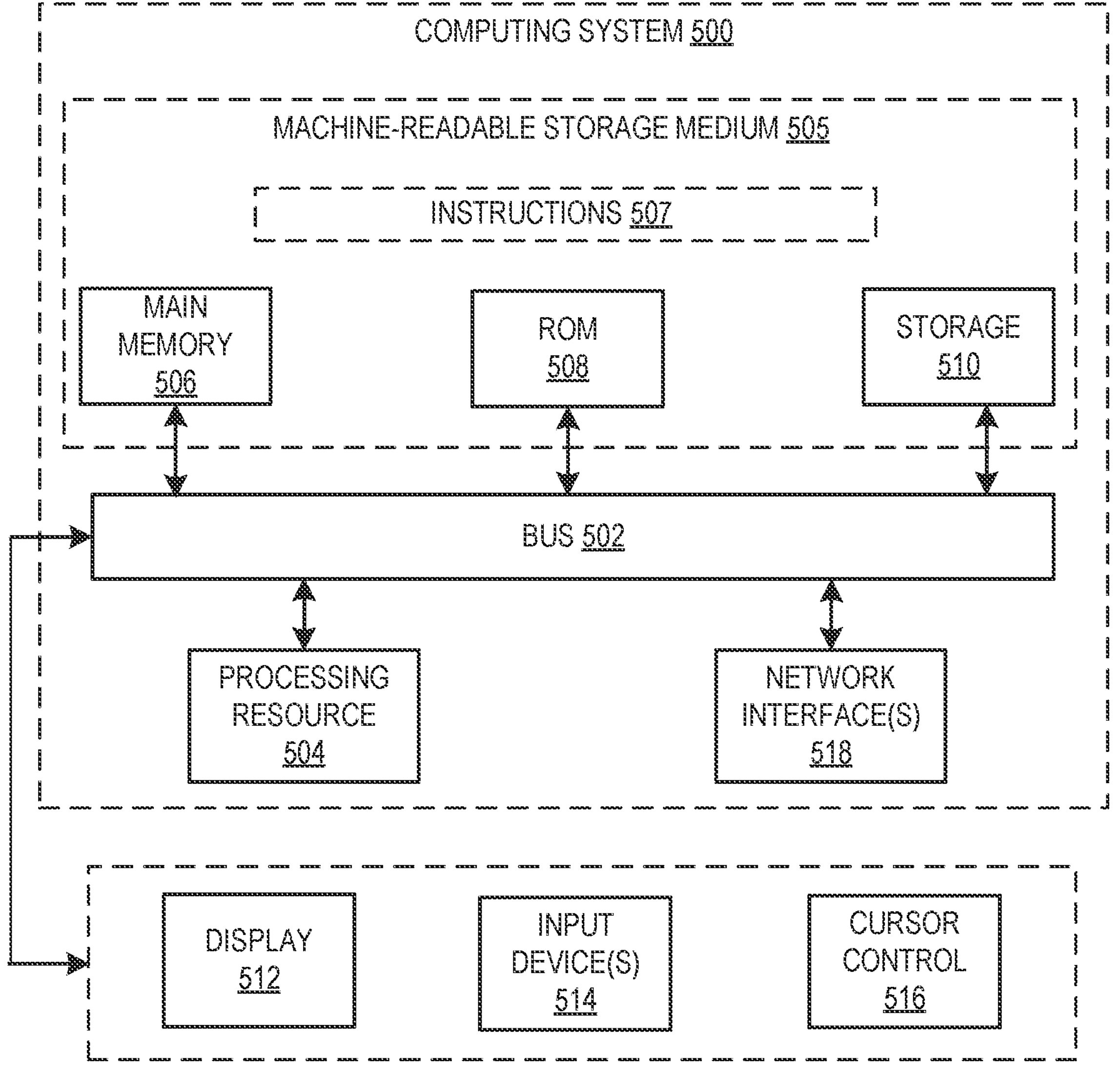
FIG. 5 depicts a block diagram of an example computing system.

FIG. 5 depicts a block diagram of an example computing system 500 in which various of the examples described herein may be implemented. In some examples, the computing system 500 may be configured to operate as a wireless networking device, such as, an access point, WLAN controller, router, or the like, and can perform various operations described in conjunction with one or more of the earlier drawings. In particular, in some other examples, the computing system 500 may be configured to operate as an AP, such as the wireless networking device 100 of FIG. 1, and can perform various operations described in one or more of the earlier drawings. Examples of the devices and/or systems that may be implemented as the computing system 500 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, PDAs, mobile phones, smartphones, smart terminals, dumb terminals, virtual terminals, video game consoles, virtual assistants, and the like.

The computing system 500 may include a bus 502 or other communication mechanisms for communicating information, a hardware processor, also referred to as processing resource 504, and a machine-readable storage medium 505 coupled to the bus 502 for processing information. In some examples, the processing resource 504 may include one or more CPUs, semiconductor-based microprocessors, and/or other hardware devices suitable for retrieval and execution of instructions stored in the machine-readable storage medium 505. The processing resource 504 may fetch, decode, and execute instructions to selectively filter Wi-Fi signals to avoid interference between operating channels of the computing system 500. As an alternative or in addition to retrieving and executing instructions, the processing resource 504 may include one or more electronic circuits that include electronic components for performing the functionality of one or more instructions, such as an FPGA, an ASIC, or other electronic circuits.

In some examples, the machine-readable storage medium 505 may include a main memory 506, such as a RAM, cache and/or other dynamic storage devices, coupled to the bus 502 for storing information and instructions to be executed by the processing resource 504. The main memory 506 may also be used for storing temporary variables or other intermediate information during the execution of instructions to be executed by the processing resource 504. Such instructions, when stored in storage media accessible to the processing resource 504, render the computing system 500 into a special-purpose machine that is customized to perform the operations specified in the instructions. The machine-readable storage medium 505 may further include a read-only memory (ROM) 508 or other static storage device coupled to the bus 502 for storing static information and instructions for the processing resource 504. Further, in the machine-readable storage medium 505, a storage device 510, such as a magnetic disk, optical disk, or USB thumb drive (Flash drive), etc., may be provided and coupled to the bus 502 for storing information and instructions.

In some examples, the computing system 500 may be coupled, via the bus 502, to a display 512, such as a liquid crystal display (LCD) (or touch-sensitive screen), for displaying information to a computer user. In some examples, an input device 514, including alphanumeric and other keys (physical or software generated and displayed on a touch-sensitive screen), may be coupled to the bus 502 for communicating information and command selections to the processing resource 504. Also, in some examples, another type of user input device such as a cursor control 516 may be connected to the bus 502. The cursor control 516 may be a mouse, a trackball, or cursor direction keys. The cursor control 516 may communicate direction information and command selections to the processing resource 504 for controlling cursor movement on the display 512. In some other examples, the same direction information and command selections as cursor control may be implemented via receiving touches on a touch screen without a cursor.

In some examples, the computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 500 also includes a network interface 518 coupled to bus 502. The network interface 518 provides a two-way data communication coupling to one or more network links that are connected to one or more local networks. For example, the network interface 518 may be an integrated services digital network (ISDN) card, cable modem, satellite modem, or a modem to provide a data communication connection to a corresponding type of telephone line. As another example, the network interface 518 may be a local area network (LAN) card or a wireless communication unit (e.g., Wi-Fi chip/module).

In some examples, the machine-readable storage medium 505 (e.g., one or more of the main memory 506, the ROM 508, or the storage device 510) stores instructions 507 which when executed by the processing resource 504 may cause the processing resource 504 to execute one or more of the methods/operations described hereinabove. The instructions 507 may be stored on any of the main memory 506, the ROM 508, or the storage device 510. In some examples, the instructions 507 may be distributed across one or more of the main memory 506, the ROM 508, or the storage device 510. In some examples, the instructions 507 may include instructions that when executed by the processing resource 504 may cause the processing resource 504 to perform one or more of the methods described in FIGS. 3 and 4.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:

operating a first radio and a second radio of a wireless networking device on a first channel within a first sub-band and a second sub-band of a first frequency band, wherein the first and second radios are dedicated to operating over the first sub-band and the second sub-band, respectively;

operating a third radio and a fourth radio of the wireless networking device on a second channel within a third sub-band and a fourth sub-band of a second frequency band, wherein the first sub-band and one of the third or fourth sub-band are immediately adjacent to an inter-band gap separating the first frequency band and the second frequency band, and wherein the third and fourth radios are dedicated to operating over the third sub-band and the fourth sub-band, respectively;

operating a fifth radio of the wireless networking device on a third channel within a third sub-band of the first frequency band;

selecting one of a first filter or a second filter based on the first channel, wherein a collective passband of the first filter and the second filter is equivalent to the first sub-band;

selecting one of a third filter or a fourth filter based on the second channel, wherein a collective passband of the third filter and the fourth filter is equivalent to one of the third or fourth sub-band;

communicating a first signal over the first channel through a selected one of the first filter or the second filter;

communicating a second signal over the second channel through a selected one of the third filter or the fourth filter to avoid communication interference between the first channel and the second channel; and communicating a third signal over the third channel through a fifth filter to avoid communication interference among the first channel, the second channel, and the third channel.

2. The method of claim 1, wherein the first filter ends at an ending frequency of the first frequency band, and the second filter begins at a starting frequency of the first sub-band, and wherein the first filter is narrower than the second filter.

3. The method of claim 1, wherein the third filter begins at a starting frequency of the second frequency band, and the fourth filter ends at an ending frequency of the one of the third or fourth sub-band, and wherein the third filter is narrower than the fourth filter.

4. The method of claim 1, wherein selecting one of the first filter or the second filter comprises:

selecting the first filter in response to determining that the first filter encompasses the first channel; and selecting the second filter in response to determining that the first filter does not encompass the first channel.

5. The method of claim 1, wherein selecting one of the third filter or the fourth filter comprises:

selecting the third filter in response to determining that the third filter encompasses the second channel; and selecting the fourth filter in response to determining that the third filter does not encompass the second channel.

6. The method of claim 1, wherein the first filter and the second filter have overlapping passbands.

7. The method of claim 1, wherein the third filter and the fourth filter have overlapping passbands.

8. The method of claim 1, further comprising:

operating a sixth radio of the wireless networking device on a fourth channel within a fourth sub-band of the first frequency band; and communicating a fourth signal over the fourth channel through a sixth filter to avoid communication interference among the first channel, the second channel, the third channel, and the fourth channel.

9. The method of claim 1, wherein the first frequency band and the second frequency band are the 5 GHz band and the 6 GHz band, respectively, specified in one or more of the Institute of Electrical and Electronics Engineers (IEEE) 802.11 Specifications.

10. The method of claim 9, wherein:

the first sub-band ranges from 5490 MHz to 5895 MHz;

the second sub-band ranges from 5945 MHz to 6425 MHz;

the first filter ranges from 5735 MHz to 5895 MHZ;

the second filter ranges from 5940 MHz to 5835 MHz;

the third filter ranges from 5945 MHz to 6265 MHz; and the fourth filter ranges from 6105 MHz to 6425 MHz.

11. An access point, comprising:

a first radio dedicated to operation on a first channel within a first sub-band of a first frequency band;

a second radio dedicated to operation on the first channel within a second sub-band of the first frequency band;

a third radio dedicated to operation on a second channel within a third sub-band of a second frequency band;

a fourth radio dedicated to operation on the second channel within a fourth sub-band of the second frequency band, wherein the first sub-band and one of the third or fourth sub-band are immediately adjacent to an inter-band gap separating the first frequency band and the second frequency band;

a fifth radio operable on a third channel within a third sub-band of the first frequency band;

a sixth radio operable on a fourth channel within a fourth sub-band of the second frequency band; and a seventh radio operable on a fifth channel in a third frequency band;

a first filter and a second filter coupled to the first radio and having a collective passband equivalent to the first sub-band;

a third filter and a fourth filter coupled to the second radio and having a collective passband equivalent to the one of the third or fourth sub-band; and a control unit coupled to the first radio, the second radio, the third radio, the fourth radio, the first filter, the second filter, the third filter, and the fourth filter, wherein the control unit is configured to communicate a first signal over the first channel through a selected one of the first filter or the second filter, and communicate a second signal over the second channel a selected one of the third filter or the second filter.

12. The access point of claim 11, wherein the control unit is further configured to communicate a third signal, a fourth signal, and a fifth signal via a fifth filter, a sixth filter, and a seventh filter, respectively.

13. The access point of claim 11, wherein the first frequency band, the second frequency band, and the third frequency band are the 5 GHz band, the 6 GHz band, and the 2.4 GHz band, respectively, defined in one or more of the Institute of Electrical and Electronics Engineers (IEEE) 802.11 Specifications.

14. The access point of claim 11, wherein:

the first sub-band ranges from 5490 MHz to 5895 MHz;

the second sub-band ranges from 5945 MHz to 6425 MHz;

the first filter ranges from 5735 MHz to 5895 MHz;

the second filter ranges from 5940 MHz to 5835 MHZ;

the third filter ranges from 5945 MHz to 6265 MHz; and the fourth filter ranges from 6105 MHz to 6425 MHz.

* * * * *